US005114771A

United States Patent [19]

Ogg et al.

[11] Patent Number: 5,114,771

[45] Date of Patent: May 19, 1992

[54] PERFORATOR BLADE FOR PAPER PRODUCTS AND PRODUCTS MADE THEREFROM

[75] Inventors: Randy G. Ogg, Cincinnati; Mark A. Habel, Oxford, both of Ohio

[73] Assignee: The Procter & Gamble Company, Cincinnati, Ohio

[21] Appl. No.: 625,511

[22] Filed: Dec. 11, 1990

[51] Int. Cl.[5] .............. B32B 3/10

[52] U.S. Cl. .............. 428/43; 428/906; 428/131; 428/136

[58] Field of Search .............. 428/43, 906, 131, 136; 206/390

[56] References Cited

U.S. PATENT DOCUMENTS

| | | | |
|---|---|---|---|
| 2,328,109 | 8/1943 | Thompson | 428/43 |
| 4,238,541 | 12/1980 | Burton | 428/43 |
| 4,627,117 | 12/1986 | Morishita | 428/43 |
| 4,963,406 | 10/1990 | Gooding, Jr. et al. | 428/43 |

OTHER PUBLICATIONS

The Kinetic Company Advertising Brochure, "Operating Principles of the Kinetic High Speed Perforating Blade" (Apr. 1988).

*Primary Examiner*—Alexander S. Thomas

*Attorney, Agent, or Firm*—Larry L. Huston; Fredrick H. Braun; Richard C. Witte

[57] ABSTRACT

Disclosed is a perforator blade for core wound paper products, such as toilet tissue and paper towels. The perforator blade has a relatively narrow notch width and a relatively narrow tooth width. As the notch width and tooth width of the perforator blade are decreased, the total notch width, which is the aggregate of the width of each notch across the total width of the perforator blade, is similarly decreased.

A perforator blade according to the present invention provides very high perforation bond strengths, joining superimposed plies in face-to-face relation, without unduly increasing the tensile strength of the lands bridging adjacent sheets of the core wound paper product. Also, individual tooth flexibility is increased according to the present invention resulting in enhanced perforator blade life and perforation bond quality. Perforated paper products according to the present invention also exhibit less lint, reducing hygiene problems, reduced occurrences of sheet tearing during dispensing, and provide a smoother, better finished appearance during dispensing.

5 Claims, 5 Drawing Sheets

PERFORATOR BLADE FOR PAPER PRODUCTS AND PRODUCTS MADE THEREFROM

FIELD OF THE INVENTION

This invention relates to a means for perforating consumer products into sheets, more particularly to an improved perforator blade for toilet tissue and paper towels, and to the products perforated by the improved perforator blade.

BACKGROUND OF THE INVENTION

Core wound paper products are in frequent use in today's society. Such products often have a hollow tubular core about which a roll of the product to be used is wound. Particularly popular core wound paper products include toilet tissue and paper towels.

Core wound paper products are frequently made of two plies, which are typically identical, and are superimposed in face-to-face relation to form a unitary laminate. Dual plies having a particular aggregate thickness are generally preferred over a single ply having the same thickness, because the resulting dual ply laminate is softer than the single ply product. Of course, comparable absorbency and tensile strength can be obtained, whether the total thickness is comprised of one ply having a predetermined thickness or of two plies, each having approximately one-half the predetermined thickness.

The superimposed plies may be adhesively joined in face-to-face relation to prevent each from separating from the other ply. However, adhesive joining increases both the manufacturing cost and the stiffness of the core wound paper product. Therefore, it is desirable that the core wound paper product have superimposed plies which remain joined in face-to-face relationship without the expense and stiffness of adhesive, and yet present a unitary laminate to the consumer during use.

An additional manufacturing consideration is that the consumer usually does not wish to use the entire roll of paper product at once. To aid the consumer in selecting and dispensing the proper portions of the product, the roll of paper product is provided with lines of weakness generally parallel the axis of the core about which the paper product is wound. The lines of weakness may comprise perforations which divide the core wound paper product into individual sheets which are joined across the perforations, yet are easily separated from the adjacent sheet.

The perforations provide for incremental dispensing of individual and multiple sheets of the product. This feature allows the consumer to conveniently dispense a particular quantity of the product at his or her convenience.

The perforations may be made by perforator blades employed during the manufacturing process. The perforator blades are typically mounted on a rotating cylinder and have alternately spaced teeth and notches across the total width of the perforator blade. The teeth of the perforator blade are responsible for the small cuts which define and divide adjacent sheets of the paper product, while the notches of the perforator blade are responsible for the lands of the paper product which bridge adjacent sheets and hold the roll of sheets together.

During the perforating step of the manufacturing process, the paper product is interposed between the perforator blade and a rigid anvil. The rotating perforator blades strike the paper product while it is held against the anvil, and cut through the thickness of the paper product, at the teeth of the perforator blade. The transverse lines of weakness dividing and defining adjacent sheets are formed when the teeth of the perforator blade cut through the paper product to form the perforations.

The perforator blade, and the associated manufacturing process, control certain properties of the finished product. It is important that the perforator blades produce desirable properties in the finished product—so that consumer acceptance of an otherwise suitable product is not diminished by, for example, poor dispensing caused by the type or nature of the perforations imparted by the perforator blades. Furthermore, it is important that the perforator blades be as long lasting as reasonably achievable, so that unduly frequent change-out of the perforator blades, downtime of machinery, or other maintenance is not required.

The relative size, including the length, width and thickness of the perforator blade teeth and notches control several properties directly related to the dispensability and performance of the paper product. For example, if the notches of the perforator blade are too narrow, for a given total notch width, the tensile strength between adjacent sheets of the paper product will be too great, and it will be difficult for the consumer to tear one sheet of the paper product from the remainder of the roll of the product. Also, if the tensile strength of the perforations joining the adjacent sheets is too great, the sheet may not tear along the transverse line of weakness as desired, but rather may tear through the middle of the sheet, resulting in an undesired ragged appearance and two sheets of nonuniform size.

Additionally, if the notch width is too great, for a given total notch width, the bond strength joining superimposed plies in face-to-face relation across the cuts of the perforations may be too small and the superimposed plies of the sheet may easily separate. If the two plies separate, an individual ply is typically insufficient for the consumer's desired end use.

Thus, there is a tension between two desired properties of the core wound paper product. If the notch width is too narrow, the tensile strength between adjacent sheets becomes too great, while the bond strength between superimposed plies is improved. Clearly, a need exists to find a perforator blade which can accommodate the properties of both of these diametrically opposed needs.

Furthermore, it is desired to reduce the amount of lint created during manufacturing. The lint can create a hygiene problem if the amount of lint becomes excessive. The hygiene problem stems from the accumulation of lint which can lead to spontaneous combustion or fall, in clusters, from higher elevations and be incorporated into the paper product in a clump.

To reduce the amount of lint created during manufacturing, cellulosic (and any other) fibers of the paper product need to be securely held to the sheet during and after the perforating step. To securely hold the fibers, it is desirable to utilize relatively narrow teeth in the perforator blade. This introduces yet another parameter that must be taken into consideration when selecting the proper geometry for the perforator blade.

Yet another parameter controlled by the perforator blade is the visual appearance of the free edge of the sheet remaining after an adjacent sheet is removed by tearing through the perforations. The consumer desires an aesthetically pleasing free edge in the product after dispensing. A more aesthetically pleasing free edge typically requires a smoother, less jagged appearance between the cut and uncut areas at the edge of the sheet.

Several attempts have been made in the art to allow a wide selection in the parameters determining the geometry of the perforator blade used in the perforating process. For example, one supplier of perforator blades, the Kinetic Company of Greendale, Wis., has at least six different parameters available for selection (within reasonable limits) by the end user of the perforator blade. As illustrated in the advertising literature, an end user ordering a perforator blade from the Kinetic Company can select: the total number of notches per side of the perforator blade, the width of each notch, the thickness of the perforator blade perpendicular to its width, the overall height of the perforator blade in the other direction perpendicular to its width, the total width of the perforator blade, and whether or not the distal edges of the teeth of the perforator blade are straight (as illustrated in the accompanying figures) or are concave arcuate with a radius to be selected.

One attempt, illustrated in U.S. Pat. No. 4,963,406 issued Oct. 16, 1990 to Gooding, Jr. et al. is directed to perforated paper products having three parallel lines of perforations. A sheet of the product is torn from the adjacent sheet by tearing along the central line of the three, so that the other two lines of perforations maintain the bond between the plies. The perforations have a width of 1.5 millimeters to 2.5 millimeters (0.06 to 0.1 inches) on a spacing of 0.8 millimeters to 1.3 millimeters (0.03 to 0.05 inches) for toilet tissue, and a width of 0.3 millimeters to 0.4 millimeters (0.01 to 0.15 inches) on a spacing of 0.8 millimeters to 1.3 millimeters (0.03 to 0.06 inches).

However, this teaching triples the complexity of the perforating process. Three perforating blades are required, in the place of each single perforating blade used in the prior art. More frequent perforating blade breakage, and consequently, machine downtime to replace broken perforating blades will occur with a triple perforating blade apparatus, as taught in this reference.

Another teaching can be found in single ply, continuous feed, Z-fold computer paper sold by Willamette, Industries, Inc. of Willamette, Ill. This paper has perforations dividing adjacent sheets and the sprocket feed strips. The cuts of the perforations are about 0.17 millimeters (0.0065 inches) in width and the lands are about 0.17 millimeters (0.0065 inches) in width, and the paper has about 340 lands per 113 millimeters (4.46 inches) of paper width. However, due to the relatively low total land width across the entire width of the paper, the perforation tensile strength of this paper is too low for core wound paper products, such as toilet tissue and paper towels.

Several recent and specific attempts to optimize the perforator blade geometry can be observed in the art. For example, 114 millimeter (4.5 inches) wide Kleenex brand toilet tissue made by the Kimberly-Clark Corporation of Neenah, Wis., are made utilizing a perforator blade having a tooth width of about 1.0 millimeters (0.04 inches) and a notch width of about 0.6 millimeters (0.03 inches) and a total notch width of about 47.6 millimeters (1.88 inches). However, utilizing a perforator blade according to the present invention, the perforation tensile strength joining adjacent sheets is maintained, and significant improvements in the perforation bond strength between superimposed plies may be obtained over the prior art—while improving the overall perforator blade life.

Accordingly, it is an object of this invention to provide a perforator blade which optimizes both diametrically opposed properties of perforation tensile strength between adjacent sheets and perforation bond strength between superimposed plies. It is also an object of this invention to provide a perforator blade which has a life at least as long as those of perforator blades according to the prior art.

Finally, it is an object of this invention to provide a perforator blade which diminishes the hygiene problems that occur during manufacturing and are caused by the lint produced during the perforating process. Yet the perforator blade should yield a perforation, which when visible to the consumer, has a more aesthetically pleasing appearance than perforations made by perforator blades according to the prior art.

BRIEF SUMMARY OF THE INVENTION

The invention comprises a perforator blade for paper products. The perforator blade has alternately spaced teeth and notches. The teeth have a tooth width less than about 1.4 millimeters (0.06 inches) and the notches have a notch width less than about 0.5 millimeters (0.02 inches). The perforator blade has a total notch width less than about 0.27 millimeters per millimeter (0.27 inches per inch) of blade width.

The invention also comprises a paper product having sheets defined by alternately spaced cuts and lands. The cuts have a width less than about 1.4 millimeters (0.06 inches) and the lands have a width less than about 0.5 millimeters (0.02 inches). The paper product has a total land width less than about 30.5 millimeters per 11.33 centimeters of paper product width.

BRIEF DESCRIPTION OF THE DRAWINGS

While the Specification concludes with claims particularly pointing out and distinctly claiming the present invention, it is believed the same will be better understood from the following description taken in conjunction with accompanying drawings wherein like parts are given the same reference numeral and;

DETAILED DESCRIPTION OF THE INVENTION

Figure 1A:
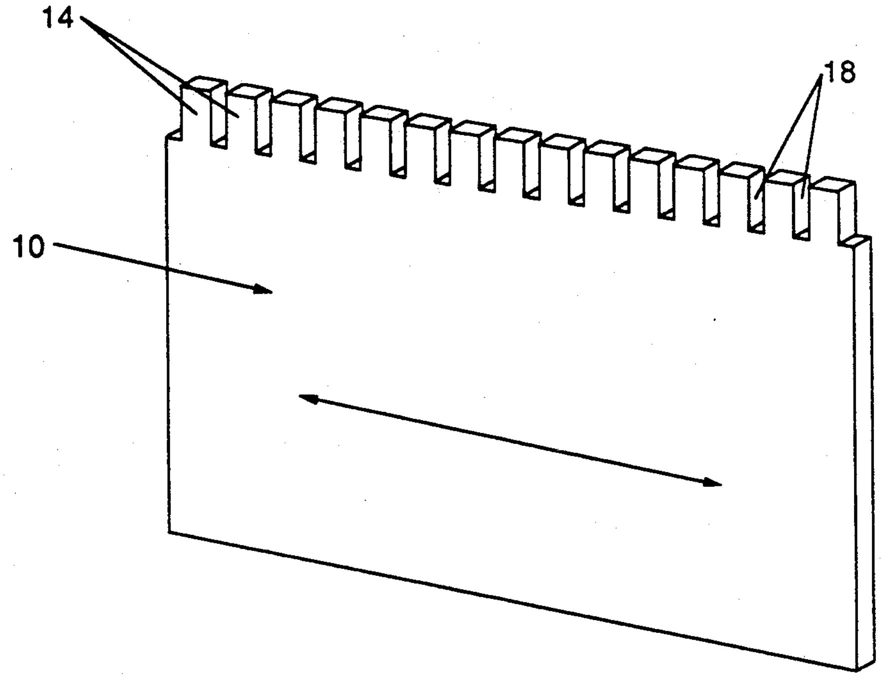
FIG. 1A is a perspective view of a perforator blade showing its various components.

FIG. 1A illustrates a perforator blade 10 and its various components. The perforator blade 10 is generally planar, having a major axis A—A within the plane of the perforator blade 10 and orthogonal the direction of the teeth 14. The "thickness" of the perforator blade 10 is the dimension of the perforator blade 10 taken perpendicular to the plane defined by the perforator blade 10 and, is typically, but not necessarily, constant.

The "tooth" of the perforator blade 10 is a protuberance extending from a proximal end where it is joined to the rest of the perforator blade 10, to a distal end which contacts the core wound paper product during the perforating operation. The dimension from the proximal end of a tooth 14 to the distal end of a tooth 14 is considered to be the "length" of the tooth 14. Intermediate each tooth 14 is a slot or a gap, defining a "notch." The notches 18 are oriented parallel to the teeth 14.

Figure 1B:
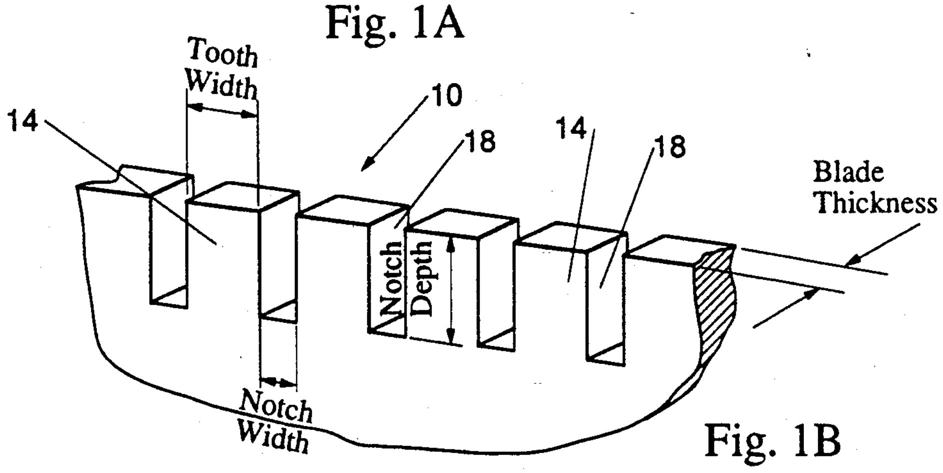
FIG. 1B is an enlarged, fragmentary, perspective view of the teeth and notches of the perforator blade of FIG. 1A.

As illustrated in FIG. 1B and as used herein, the "notch width" is the linear dimension of the notch 18, measured within the plane of the perforator blade 10 and taken in the direction of the major axis A—A of the perforator blade 10. If the notch 18 is of variable width, between the distal and proximal ends of the adjacent teeth 14 defining the notch 18, the notch width is measured at the distal edge of the notch 18.

Similarly, as used herein, the "tooth width" is the linear dimension of the tooth 14, measured within the plane of the perforator blade 10 and taken in the direction of the major axis A—A of the perforator blade 10. If the tooth 14 is of variable width, between the distal and proximate ends of the adjacent notches 18 defining the teeth 14, the tooth width is measured at the distal edge of the tooth 14.

As used herein the "notch depth" is the distance, taken with the plane of the perforator blade 10 and orthogonal the axis of the perforator blade 10, between the proximal end of a tooth 14 and the distal end of a tooth 14, as measured along the edge of a tooth 14 and, of course, is generally equivalent the tooth length. Preferably, but not necessarily, the notches 18 and teeth 14 of the perforator blade 10 are generally rectangular in shape when the perforator blade 10 is viewed in the direction orthogonal to the plane which the perforator blade 10 defines.

Each tooth 14 of the perforator blade 10 may be thought of as a cantilevered beam having a proximal end and a distal end. The cantilevered beam is loaded by the impact of the perforator blade 10 against the anvil in a direction having a vector component generally orthogonal the plane of the perforator blade 10. Each tooth 14 of the perforator blade 10 has a constant section modulus throughout its length, providing the tooth 14 is of constant width and the perforator blade 10 is of constant thickness. Preferably the section modulus of the tooth 14 of the perforator blade 10 is not too great, otherwise perforation bond strength may be impaired.

The geometry of the perforator blade 10 may be defined in terms of primary parameters, secondary parameters, and tertiary parameters. The primary parameters of the perforator blade 10 are those parameters which dictate the individual tooth 14 and notch widths, the total number of teeth 14 or notches 18, and the total width of the perforator blade 10.

The secondary parameters, such as the length of a tooth 14, are within the plane of the perforator blade 10, and govern the geometry of the teeth 14 and notches 18 in the lengthwise direction of the teeth 14 and notches 18. The tertiary parameters include the thickness (whether constant or tapered) of the perforator blade 10 and the material selected for the perforator blade 10 construction.

The perforator blade 10 may be totally defined, in terms of its primary parameters, by selecting any three of the numbered parameters listed below:

1. Notch width,
2. Tooth width,
3. Total notch width or total tooth width,
4. Total number of notches 18 or total number of teeth 14, and
5. Perforator blade width.

The tooth width and the notch width parameters are as defined above and are related to other primary parameters. For example, as used herein, the "total tooth width" is the aggregate of the width of each tooth 14 taken across the entire width of the perforator blade 10, i.e., the width of an individual tooth 14 multiplied by the number of teeth 14 on the perforator blade 10. Similarly, as used herein, the "total notch width" is the aggregate of the width of each notch 18 across the entire width of the perforator blade 10, i.e., the width of an individual notch 18 multiplied by the total number of notches 18. The total notch width and the total tooth width are inversely proportional. For a given total perforator blade width, one will increase at the diminution of the other and vice-versa.

The "total perforator blade width" is the linear distance between the opposite edges of the perforator blade 10, as measured in the direction of the major axis A—A of the perforator blade 10. It will be apparent to one skilled in the art that the total number of teeth 14 and total number of notches 18 may be determined by tallying each across the width of the perforator blade 10.

The total width of the perforator blade 10 is less than the total width of the paper product to be perforated by the particular perforator blade 10. This is to prevent teeth 14 on adjacent perforator blades 10 from interfering which each other. At each end of the perforator blade 10 is a tooth 14 or a notch 18 which may or may not be equivalent the width of the other teeth 14 or notches 18. The tooth width or notch width at the edge of each perforator blade 10 is taken into account when aggregating the notches 18 to determine the total notch width.

Figure 2:
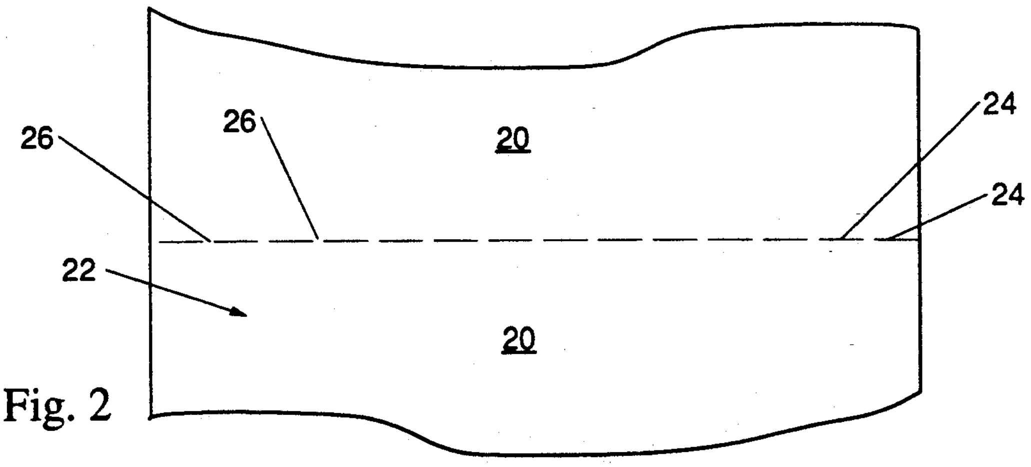
FIG. 2 is a fragmentary plan view of a paper product perforated by the perforator blades of FIGS. 1A and 1B.

As illustrated in FIG. 2, the perforator blade 10 of FIGS. 1A and 1B produces sheets 20 of perforated paper product. Each sheet 20 is divided from the adjacent sheet 20 and lengthwise defined by the perforations 22. The perforations 22 comprise alternately spaced cuts 24 and lands 26 corresponding in size and position to the teeth 14 and notches 18 of the perforator blade 10, respectively.

Figure 3:
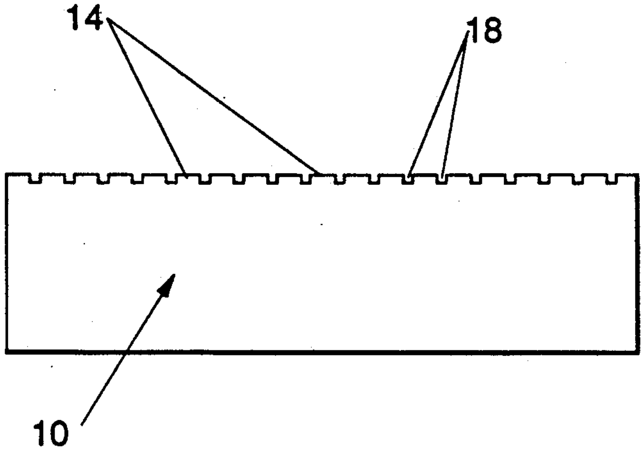
FIG. 3 is a plan view of a perforator blade according to the prior art and is perforator blade number 2 in the Examples.

FIG. 3 illustrates typical primary parameters of a perforator blade 10 according to the prior art. For example, the perforator blade 10 of FIG. 3 has a total perforator blade 10 width of 11.33 centimeters (4.46 inches), which has become a standard in the industry. This perforator blade 10 has a notch width of about 1.4 millimeters (0.06 inches) and a tooth width of about 4.1 millimeters (0.16 inches). This perforator blade 10 has 21 total teeth 14 and 20 total notches 18, yielding a total notch width of about 27.4 millimeters (1.08 inches) and a total tooth width of about 85.9 millimeters (3.38 inches).

Figure 4:
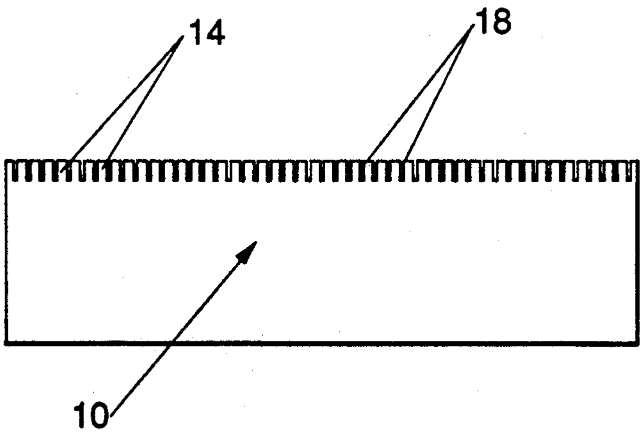
FIG. 4 is a plan view of a perforator blade according to the present invention and is perforator blade number 5 in the Examples.

As illustrated in FIG. 4, a perforator blade 10 according to the present invention balances the competing interests, noted above, of not increasing the desired perforation bond strength at the expense of unduly increasing perforation tensile strength. This is accomplished by having a perforator blade 10 with teeth 14 less than about 1.4 millimeters (0.06 inches) in width, preferably less than about 1.1 millimeters (0.04 inches) in width, and more preferably less than about 0.9 millimeters (0.03 inches) in width.

As the tooth width decreases, the tooth 14 of the perforator blade 10 becomes more flexible. Because the tooth 14 is more flexible, a higher interference between the perforator blade 10 and the anvil may be utilized without causing breakage or unduly shortening the life of the perforator blade 10.

Additionally, because the teeth 14 are more flexible, when the perforator blade 10 rotates to contact the anvil, each tooth 14 remains in contact with the anvil for a longer period of time than would a relatively stiffer tooth 14. This more completely forms a glassine structure—joining two superimposed plies of the paper into a more unitary, less easily separated laminate.

Also, because the teeth 14 of the perforator blade 10 according to the present invention are narrower in width, each tooth 14 will not contact as many fibers of the paper product as do relatively wider teeth 14 according to the prior art. Because the teeth 14 do not contact as many fibers of the paper product, there are fewer occurrences of teeth 14 contacting both low density areas and high density areas of the paper product. Thus, by not having a tooth 14 in contacting relation with regions of the paper having different densities, a more uniform pressure is applied to the paper product, particularly the high density regions, more complete glassine formation occurs and perforation bond strength is increased.

The narrower teeth 14 of the perforator blade 10 according to the present invention yield another advantage. The glassine areas, which represent welds at the ends of the fibers, connect to form a glassine block in the resulting laminate. Because the fibers in the glassine block are held together and to the rest of the paper product, such fibers are less prone to coming loose and producing lint. Thus, the amount of lint produced by a perforator blade 10 according to the present invention is reduced during manufacturing by more securely bonding free fibers at the edges of the perforations 22 to the sheet 20. This represents a significant reduction in free floating lint and the attendant hygiene problems.

A perforator blade 10 according to the present invention also has a relatively lesser notch width than a perforator blade 10 according to the prior art. Particularly, a perforator blade 10 according to the present invention has a notch width of less than about 0.5 millimeters (0.02 inches) and preferably a notch width less than about 0.3 millimeters (0.01 inches). A narrower notch 18 reduces the amount of perforation bond destruction which occurs when the consumer dispenses the product and tears one sheet 20 from the adjacent sheet 20.

Perforation bond destruction occurs when the cuts 24 of the perforation 22 is broken by tensile forces transmitted between adjacent sheets 20 across the lands 26 bridging the cuts 24 between such sheets 20. The tensile forces propagate transversely across the cut 24 from each adjacent land 26 and may cause separation of the superimposed plies from the edge of each cut 24 in the perforation 22 to the center of each cut 24 in the perforation 22.

By having a relatively lesser notch width, the land 26 area bridging adjacent sheets 20 is smaller in cross-section and hence, can withstand less tensile force during dispensing. As less tensile force is imparted from transversely adjacent lands 26 to the cuts 24 between such lands 26, less perforation bond disruption occurs due to the lower tensile force imparted to such bonds before the lands 26 are broken. When the lands 26 are broken, the tensile force is no longer transmitted by the sheet 20 being dispensed to the first sheet 20 remaining on the roll and disruption of the bonding between superimposed plies ceases.

Reducing the notch width, and hence the cross-sectional area, of the lands 26 bridging adjacent sheets 20 produces another benefit, particularly reduced occurrences of tearing of the sheet 20 at a location other than the perforations 22. Transverse tearing of a sheet 20 at a location other than the perforation 22 is undesirable and may occur when the unperforated area of the paper product has a lesser transverse tensile strength than that of the lands 26 bridging the sheet 20 to the adjacent sheet 20. The lesser transverse tensile strength is typically caused by a local defect in the paper near the perforation 22.

When the notch width is reduced, the cross-sectional area of the associated land 26 is similarly reduced, and its tensile strength is proportionally reduced. Reducing the cross sectional area of each land 26 bridging adjacent sheets 20 reduces the total tensile strength between adjacent sheets 20, providing the total number of lands is held constant, and thereby provides for easier tearing of the sheet 20 and easier dispensing.

Preferably, a paper product according to the present invention has a perforation tensile strength between adjacent sheets 20 of not more than about 47.2 grams per centimeter (120 grams per inch), measured in the transverse direction and parallel to the perforation 22. More preferably, the paper product has a perforation tensile strength of about 39.4 grams per centimeter to about 43.3 grams per centimeter (100 to 110 grams per inch).

A lesser notch width according to perforator blades 10 of the present invention provides yet another advantage. As the notch width decreases, for a given total notch width, the perforation bond strength increases. The required perforation bond strength is dependent upon the thickness of the dual ply product to be perforated. As the product becomes thicker, greater Z-direction forces are imposed on the cuts 24 at the perforations 22 when tensile forces are applied to the lands 26 during dispensing. Without being bound by any theory, it is believed the increased perforation 22 bond strength is necessary due to amplification of the Poisson effects caused by the increased thickness.

It is desired that a 0.4 millimeter (0.014 inches) thick two-ply toilet tissue according to the present invention have a perforation bond strength of at least about 0.8 grams per centimeter (2 grams per inch), measured in the transverse direction and parallel to the perforation 22. Preferably the paper product has a perforation bond strength of at least 1.6 grams per centimeter (4 grams per inch), and more preferably at least about 2.4 grams per centimeter (6 grams per inch).

It is to be recognized that very little improvement in perforation bond strength occurs at a notch width greater than about 0.5 millimeters (0.020 inches). for a given total notch width. Therefore, as noted above, a perforator blade 10 according to the present invention has the aforementioned notch width values as primary parameters.

A narrower notch width provides another advantage to the paper products made by perforator blades 10 according to the present invention. As the lands 26 bridging adjacent sheets 20 break under tensile forces applied by the consumer, cellulosic fibers may be pulled from the lands 26 and broken free from the sheet 20 to which such fibers were attached. Principally, it is transversely oriented fibers which are broken free and become free floating lint or dust.

As the width of the notch 18 is reduced, the width of the land 26 area is similarly reduced. Accordingly, fewer transversely oriented fibers in each land 26 are available to be broken free, because the transversely oriented fibers are statistically closer to a cut 24 edge and are more likely to be held in place by the glassine bonding, which occurs at the cut 24 edge. Thus, a fiber held in place, at one end, by glassine bonding is less likely to be pulled completely free from the sheet 20 and produce free floating lint and the attendant hygiene problems.

The total notch width of the perforator blade 10 may be utilized to balance the opposed interests of raising perforation bond strength, without unduly increasing perforation tensile strength above the desirable values. Specifically, as the total notch width is reduced, more individual sites are available for perforation bonding, providing of course the total perforator blade 10 width is constant. The total notch width may be reduced by having relatively narrower notch widths.

The total notch width of a perforator blade 10 according to the present invention having a total perforator blade 10 width of about 11.33 centimeters (4.46 inches) is not greater than about 30.5 millimeters (1.20 inches), preferably not more than about 25.4 millimeters (1.0 inches) and more preferably the total notch width is not greater than about 20.8 millimeters (0.82 inches).

Of course, the benefits of the present invention may be utilized with a perforator blade 10 having a different total perforator blade 10 width. To utilize the aforementioned total notch width with a perforator blade 10 having a total perforator blade 10 width other than about 11.33 centimeters (4.46 inches), the aforementioned parameters may be normalized to the total perforator blade 10 width of such a perforator blade 10. Normalizing the aforementioned total notch widths to a unit centimeter total perforator blade 10 width, the total notch width per unit perforator blade 10 width is not greater than about 0.27 millimeters per millimeter (0.27 inches per inch) preferably not greater than about 0.22 millimeters per millimeter (0.22 inches per inch) and more preferably not greater than about 0.18 millimeters per millimeter (0.18 inches per inch).

Another primary parameter of the perforator blade 10 is the total perforator blade 10 width. As noted above, a total blade width of about 11.43 centimeter (4.5 inches) has become an industry standard, to coincide with the typical width of a roll of commercially available toilet tissue. However, it is to be recognized that the benefits of the present invention may be realized with a perforator blade 10 having a greater or a lesser total perforator blade 10 width. For example, perforator blades 10 used to manufacture paper towels with a Perini winder have a total perforator blade 10 width of about 200.0 millimeters (7.87 inches).

It is to be recognized that any of the aforementioned primary parameters of total notch width or total tooth width, total number of teeth 14 or total number of notches 18, as specified herein, refer to a perforator blade 10 having a total perforator blade 10 width of about 11.33 centimeters (4.46 inches). However, as noted above, the benefits of perforator blades 10 according to the present invention can be realized with perforator blades 10 having a different total perforator blade 10 width, so long as these primary parameters are normalized to the new perforator blade 10 width.

Referring to the secondary parameters, one of the more important secondary parameters is the ratio of the notch width to the notch depth, which ratio determines the "aspect ratio" of a given notch 18. As used herein, the aspect ratio of a notch 18 refers particularly to the value of the notch width divided by the notch depth. As the aspect ratio of a notch 18 decreases, the tooth 14 bounded by adjacent notches 18 becomes more flexible, due to being relatively longer for the same section modulus.

As the aspect ratio of a notch 18 decreases, and the flexibility of the adjacent teeth 14 increases, longer dwell time of each tooth 14 on the anvil, and, of course, on the paper product between the perforator blade 10 and the anvil, will occur. Longer dwell time produces larger glassine blocks at each cut 24 in the perforation 22 and, consequently, more tightly bonded fibers at each cut 24 will occur.

Accordingly, it is desired that the notch 18 aspect ratio be less than about 0.3 and more preferably less than about 0.2. Of course, it will be apparent to one skilled in the art that similar secondary parameters may be easily computed with respect to a tooth aspect ratio taking into account to the width of the tooth 14 and the length of the tooth 14. A perforator blade 10 according to the present invention preferably has a tooth aspect ratio less than about 0.8, and more preferably less than about 0.6.

Considering the tertiary parameters of the perforator blade 10, the overall perforator blade 10 thickness is commonly about 1.0 millimeters (0.040 inches). Of course, thinner perforator blades 10 may be utilized to achieve greater tooth 14 flexibility, as noted above. However, thinner perforator blades 10 typically require custom manufacturing, an attendant increase in cost of each perforator blade 10, and frequently have a shorter life before one or more of the teeth 14 of the perforator blade 10 fractures.

Perforator blades are typically made of hardened steel material, having a minimum hardness of about $Rockwell_C$ 60. While relatively softer materials may be utilized to increase the tooth 14 flexibility, as noted above, such flexibility and softness again occurs at the expense of perforator blade 10 life. The repeated striking of the distal end of the tooth 14 against the anvil will produce undesirably rapid wear and result in more frequent perforator blade 10 replacement.

EXAMPLES

Tests were run on five perforator blades 10, representing perforator blades 10 according to various ranges of parameters according to the prior art, and a perforator blade 10 according to the present invention. Five perforator blades 10 were selected, having the primary and secondary parameters listed in Table I. In Table I, the notch width and tooth width parameters are given in millimeters. Perforator blades 1 through 5 represent data points 1 through 5, respectively, on accompanying FIGS. 4-6, with perforator blades 1 and 5 being represented by the foregoing FIGS. 3 and 4, respectively.

All of the perforator blades 10 in the above Examples have a total notch width of about 27.6 millimeters (1.085 inches) and a total tooth width of about 85.8 millimeters (3.38 inches). With respect to the secondary parameters, the length of the teeth 14, and depth of the notches 18, of each perforator blade 10 were about 1.0 millimeters (0.04 inches). With respect to the tertiary parameters, each perforator blade 10 in this example had a total perforator blade 10 width of about 11.33 centimeters (4.46 inches); a thickness of about 1.0 millimeters (0.04 inches). Each perforator blade 10 was made of the same hardened steel material and acquired from the Kinetic Company of Greendale, Wis.

TABLE

| | Notch Width | Tooth Width | Total No. of Notches | Total No. of Teeth | Tooth Aspect Ratio | Notch Aspect Ratio |
|---|---|---|---|---|---|---|
| Blade #1 | 1.83 | 5.36 | 15 | 16 | 5.28 | 1.80 |
| Blade #2 | 1.37 | 4.09 | 20 | 21 | 4.02 | 1.35 |
| Blade #3 | 0.89 | 2.69 | 31 | 32 | 2.64 | 0.87 |
| Blade #4 | 0.58 | 1.78 | 47 | 48 | 1.76 | 0.57 |
| Blade #5 | 0.28 | 0.86 | 99 | 100 | 0.84 | 0.27 |

Ten samples of toilet tissue made by The Procter & Gamble Company of Cincinnati, Ohio under the brand name White Cloud, were perforated at a rate of about 137 meters per minute (450 feet per minute) using each of the perforator blades 10 of Table I and a hyperbolically shaped rotating anvil roll. After perforating, perforation tensile strength of each sample was measured utilizing a sample having a width of approximately 2.54 centimeters (1 inch) and a Intellect II-Std. model tensile machine made by the Thwing Albert Instrument Company of Philadelphia, Pa., and a crosshead separation speed of 10.2 centimeters per minute (4 inches per minute).

The perforation tensile strength was measured by mounting a sample of the paper product to be tested in the jaws of the tensile machine, with the perforations 22 aligned generally orthogonal the direction of crosshead separation. The crossheads of the tensile machine were separated at a rate of about 10.2 centimeters per minute (4 inches per minute) and the maximum applied tensile force was recorded. This tensile force was divided by the sample width of about 2.54 centimeters (1.0 inches), to obtain the perforation tensile strength in force per unit length.

Figure 5:
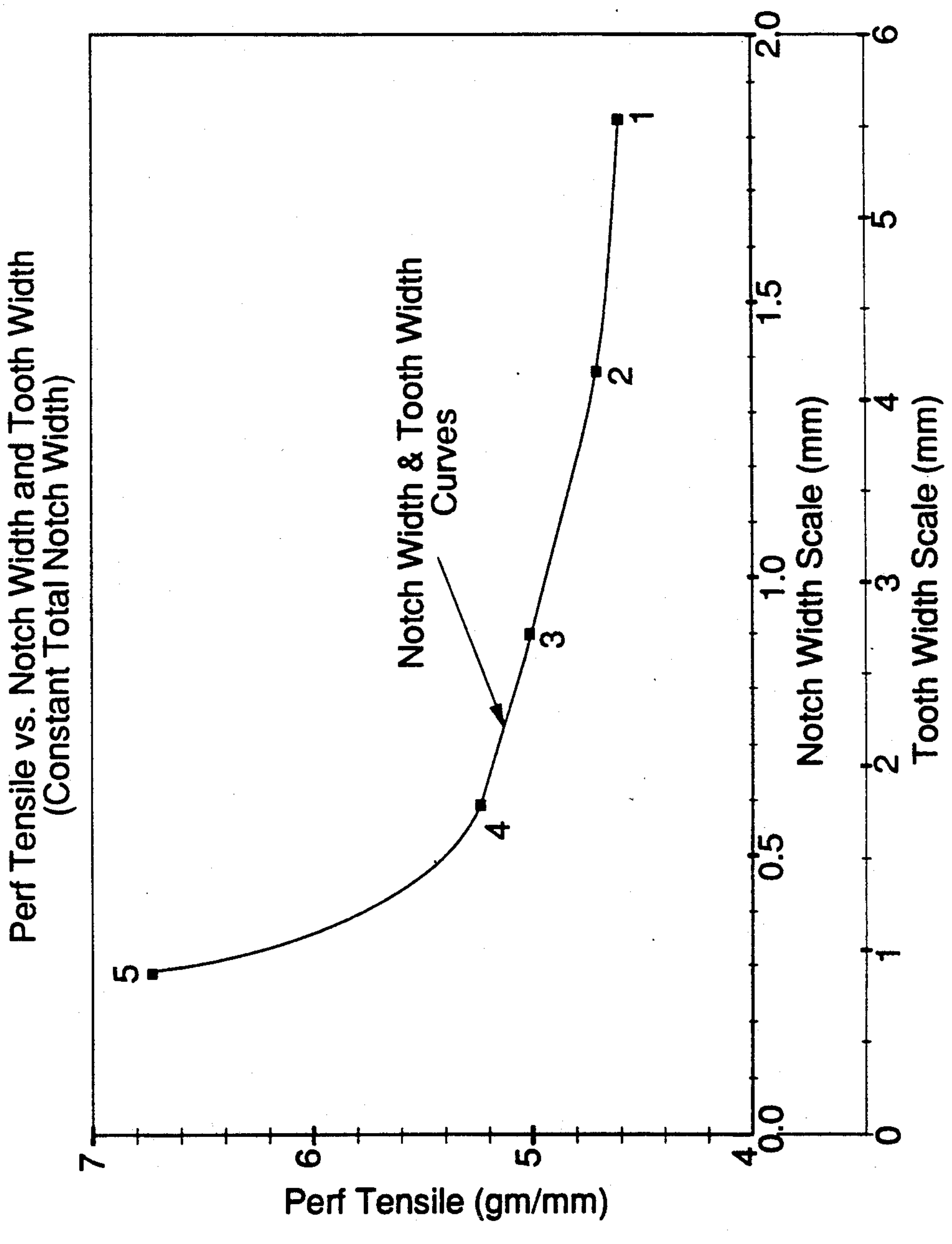
FIG. 5 is a dual abscissa graphical representation of the effect of notch width and tooth width on perforation tensile strength for five perforator blades having a constant total notch width and a constant total tooth width.

The results of the perforation tensile strength testing are graphically illustrated in FIG. 5. FIG. 5 shows that the perforation tensile strength monotonically increases nonlinearly as the tooth width becomes less than about 1.5 millimeters (0.06 inches) and the notch width becomes less than about 0.05 millimeters (0.02 inches).

The testing illustrated by FIG. 5 was conducted using five perforator blades 10 having a particular and constant total notch width and a particular and constant total tooth width. Prophetically, for a different total notch width and total tooth width, it is believed that a family of curves would appear on FIG. 5, with each curve increasing on the ordinate as the total notch width and total tooth width increase. Therefore, the total notch width should be decreased (and the total tooth width increased) with a perforator blade 10 according to the present invention, so that higher than desired perforation tensile strengths do not occur.

Perforation bond strength was measured by separating the superimposed plies of the tissue by hand, inserting one ply of the toilet tissue into a stationary set of jaws, with the other ply hanging in a generally vertical disposition and the perforations 22 generally horizontal. Dead weights are hung from the free end of the hanging ply in increments of about 1.0 gram, until the plies separate.

Figure 6:
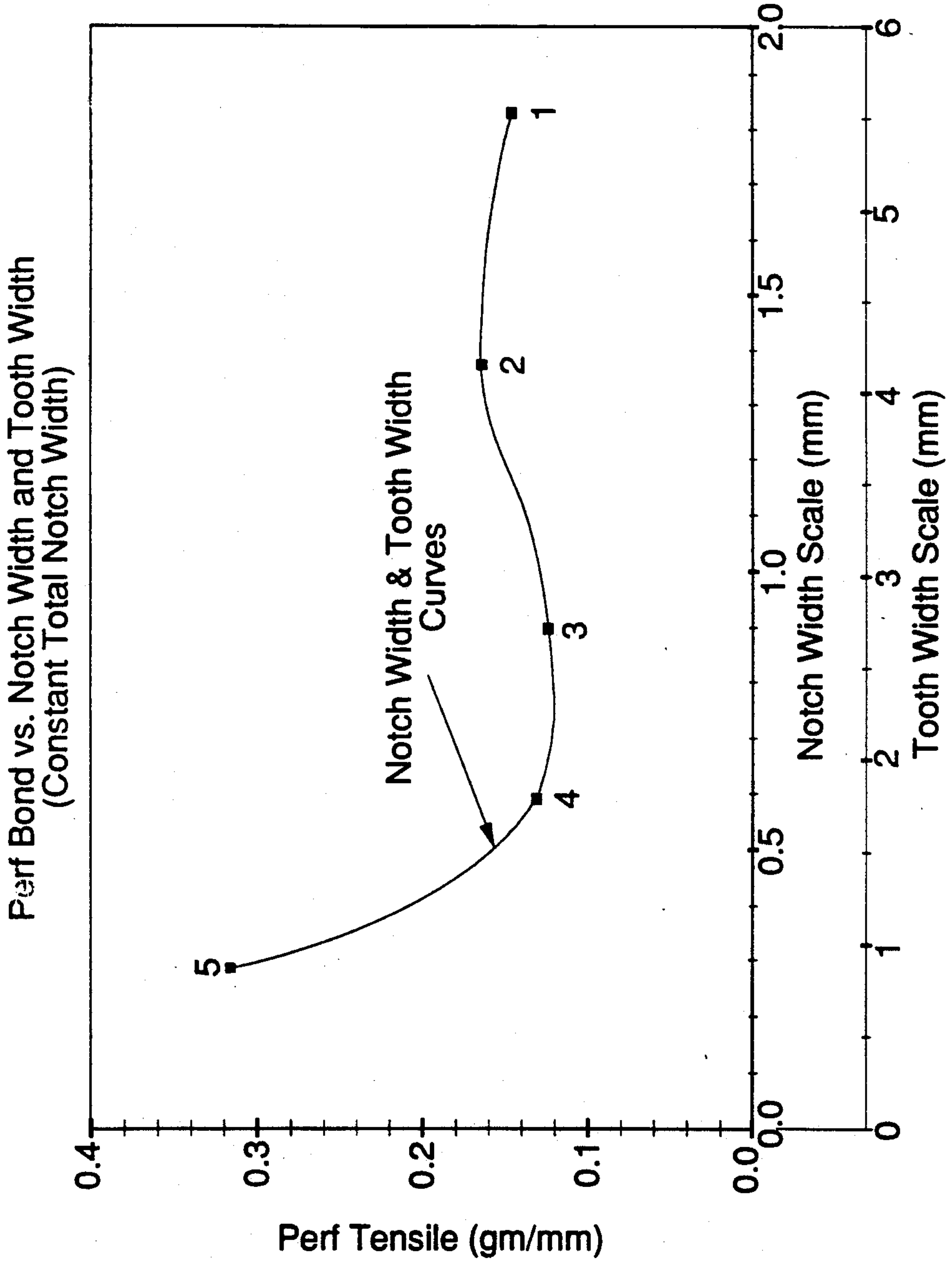
FIG. 6 is a dual abscissa graphical representation of the effect of notch width and tooth width on perforation bond strength for five perforator blades having a constant total notch width and a constant total tooth width.

FIG. 6 graphically illustrates that the perforation bond strength varies nonlinearly over a tooth width range of about 2.0 millimeters to about 5.5 millimeters (0.08 to 0.22 inches) and a notch width of about 0.7 millimeters to about 1.8 millimeters (0.03 to 0.07 inches). It is to be recognized that such nonlinear variations may be attributable to the small sample size tested and could be more precisely understood, of course, with the acquisition of additional data. However, it is shown by FIG. 6 that as the tooth width becomes less than about 1.6 millimeters (0.06 inches), the perforation bond strength monotonically increases to at least double the range of values obtained with greater tooth widths. Similarly, as the notch width becomes less than about about 0.5 millimeters (0.02 inches), the perforation bond strength increases to at least double the range found with a greater tooth width.

The testing illustrated by FIG. 6 was conducted using five perforator blades 10 having a particular and constant total notch width and a particular and constant total tooth width. Prophetically, for a different total notch width or a different total tooth width, it is believed that a family of curves would appear on FIG. 6, with each curve increasing on the ordinate as the total notch width increases. Therefore, the total notch width should be decreased with a perforator blade 10 according to the present invention, so that greater perforation bond strengths will occur.

Figure 7:
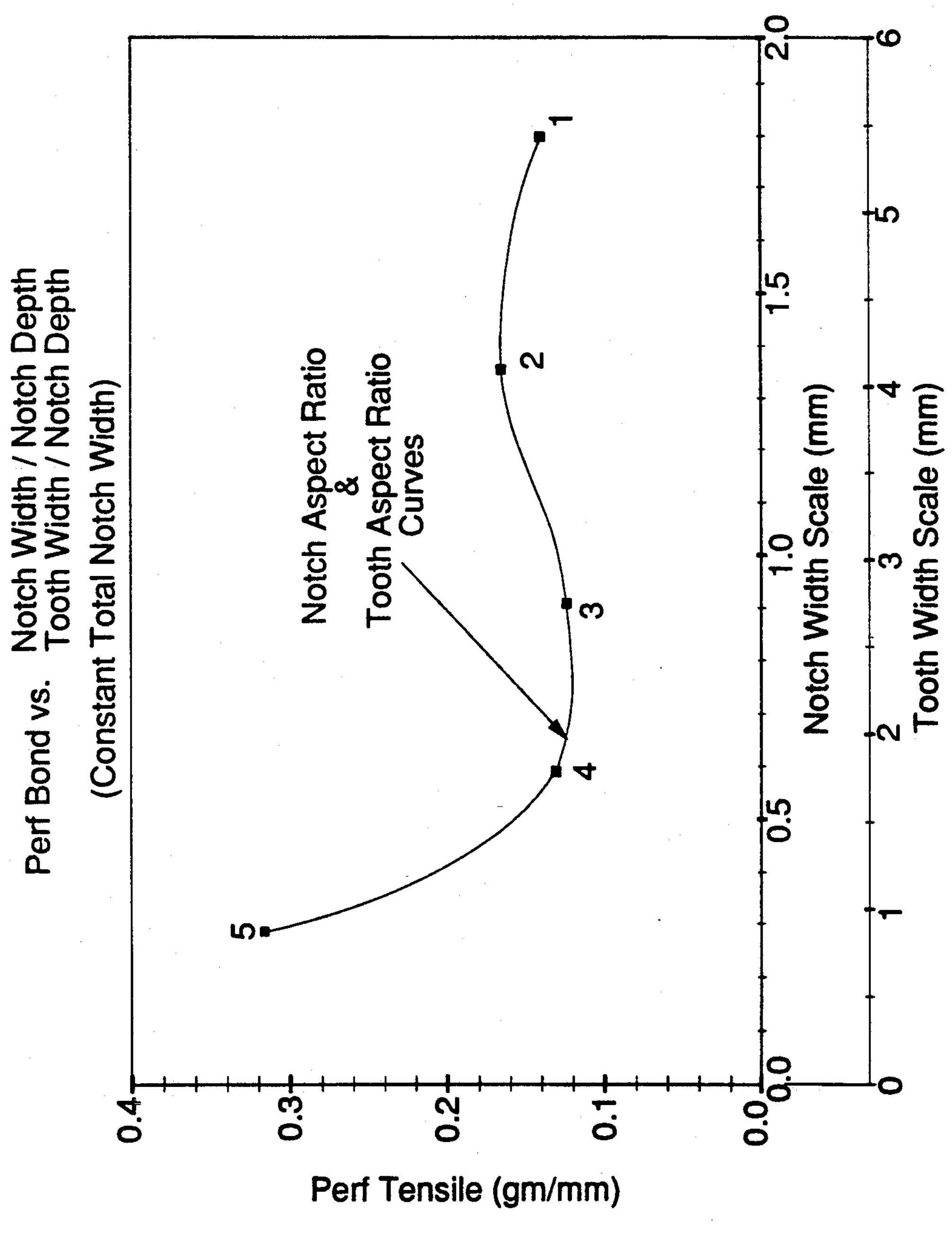
FIG. 7 is a dual abscissa graphical representation of the effect of the notch aspect ratio and the tooth aspect ratio on perforation bond strength for five perforator blades having a constant total notch width and a constant total tooth width.

FIG. 7 illustrates how secondary parameters affect perforator blade 10 performance. Particularly, from FIG. 7 it is seen that as the tooth aspect ratio varies from about 2.0 to at least about 5.0, a nonlinear relationship between the tooth aspect ratio and the perforation bond strength occurs. Similarly, as the notch 18 aspect ratio varies from about 0.7 to about 1.7, an similar nonlinear relationship occurs. It is to again be recognized that such a nonlinear relationship may be due to the sample size tested and may be more precisely refined with additional data acquisition.

It is, however, shown by FIG. 7 that as the tooth aspect ratio becomes less than about 1.0 and the notch 18 aspect ratio becomes less than about 0.4. the perforation bond strength increases to a value significantly greater than that achieved by perforator blades 10 according to the prior art. This recognition can be advantageously utilized to increase perforation bond strength independent of the perforation tensile strength and to augment the perforation bond strength which is found by optimizing tooth width and notch width.

It will be apparent to one skilled in the art that the primary parameters, such as tooth width, notch width, total tooth width, and total notch width, may be directly transferable to make a core wound paper product according to the present invention. Accordingly, from the primary parameters given above, a core wound product according to the present invention has alternately spaced cuts 24 and lands 26 corresponding to the geometry and parameters of the cuts 24 and lands 26 of the perforator blade 10 according to the present invention used to manufacture the core wound paper product. Particularly, the teeth 14 of the perforator blade 10 produce a perforation 22 having cuts 24 less than about 0.9 millimeters (0.07 inches) in width and preferably cuts 24 less than about 0.8 millimeters (0.03 inches) in width.

Conversely, the notches 18 of the perforator blade 10 produce lands 26 having a width less than about 0.5 millimeters (0.02 inches) in width, and preferably less than about 0.3 millimeters (0.01 inches) in width.

Similarly, the total land 26 width for a core wound paper product having a total product width of about 11.33 centimeters (4.46 inches) is less than about 30.5 millimeters (1.20 inches), preferably is less than about 25.4 millimeters (1.0 inches), and more preferably less than about 20.8 millimeters (0.82 inches). It will be apparent that when normalized, this will yield a total land 26 width of the paper product less than about 0.27 millimeters per millimeter (0.27 inches per inch), preferably less than about 0.22 millimeters per millimeter (0.22 inches per inch), and more preferably less than about 0.18 millimeters per millimeter (0.18 inches per inch).

Of course, it is to be recognized that several variations and permutations of the primary, secondary and tertiary parameters of the perforator blades 10 disclosed herein are feasible without departure from the spirit and scope of the claimed invention.

What is claimed is:

1. A core wound paper product having adjacent sheets defined and divided by transverse perforations, said perforations comprising alternately spaced cuts and lands, each of said cuts having a width of less than about 0.9 millimeters, and each of said lands having a width less than about 0.5 millimeters, said paper product having a total land width of less than about 30.5 millimeters per 11.33 centimeters of width of said paper product.

2. A paper product according to claim 1 wherein said cuts are less than about 0.8 millimeters in width.

3. A paper product according to claim 1, wherein each of said lands are less than about 0.3 millimeters in width.

4. A paper product according to claim 2 or 3 wherein said total land width is less than about 20.8 millimeters per 11.33 centimeters of product width.

5. A paper product according to claim 1 wherein said total width of said lands is less than about 25.4 millimeters per 11.33 centimeters of product width.

* * * * *

UNITED STATES PATENT AND TRADEMARK OFFICE
CERTIFICATE OF CORRECTION

PATENT NO. : 5,114,771

DATED : May 19, 1992

INVENTOR(S) : Randy G. Ogg, Mark A. Habel

It is certified that error appears in the above-identified patent and that said Letters Patent is hereby corrected as shown below:

IN THE DRAWINGS:

Figure 3 Add ---Prior Art---.

Column 6, line 48 "ing which" should read ---ing with which---.

Column 12, line 48 "1.7, an similar" should read ---1.7, a similar---.

Figure 1A At each end of the diagonal arrow add --A--.

Figure 2 Reference numeral 22, the lead line should be oriented upwards (towards the perforations).

Figure 6 Ordinate axis, "Tensile" should read --Bond--.

Figure 7 Ordinate axis, "Tensile" should read --Bond--.

Signed and Sealed this

Fifteenth Day of March, 1994

Attest:

Attesting Officer

BRUCE LEHMAN

*Commissioner of Patents and Trademarks*